United States Patent [19]

Pieper

[11] Patent Number: 4,789,990
[45] Date of Patent: Dec. 6, 1988

[54] GLASS MELTING FURNACE OF IMPROVED EFFICIENCY

[75] Inventor: Helmut Pieper, Lohr, Fed. Rep. of Germany

[73] Assignee: Sorg GmbH & Co. KG, Main, Fed. Rep. of Germany

[21] Appl. No.: 1,064

[22] Filed: Jan. 7, 1987

[30] Foreign Application Priority Data

Jan. 23, 1986 [EP] European Pat. Off. ........ 86100878.7

[51] Int. Cl.⁴ ............................................. C03B 5/027
[52] U.S. Cl. ....................................... 373/32; 373/34
[58] Field of Search ...................... 373/31, 32, 30, 5, 1, 373/34; 65/347

[56] References Cited

U.S. PATENT DOCUMENTS 1,944,855  1/1934  Wadman ............................... 373/32
2,658,095 11/1953  Arbeit et al. ........................... 373/31

Primary Examiner—Roy N. Envall, Jr.
Attorney, Agent, or Firm—Felfe & Lynch

[57] ABSTRACT

Disclosed is an improved efficiency glass melting furnace and a method of operation in which a mixture, or batch, is fed at a narrow side of a rectangular glass melting tank onto the molten glass mass (or bath) across the full width thereof. The furnace includes burners positioned adjacent to the opposite narrow side for supplying energy, and heat exchangers for energy exchange between the combustion exhaust gases and the combustion air supplied to the burners. The exhaust gas openings are disposed adjacent to the mixture feeding area. The furnace is provided with at least one thermal radiation shield between the burner and feed sections which extends to a small distance above the molten glass.

12 Claims, 3 Drawing Sheets

GLASS MELTING FURNACE OF IMPROVED EFFICIENCY

BACKGROUND OF THE INVENTION

The present invention is in a glass melting furnace in which a mixture, or batch, is fed at a narrow side of a rectangular glass melting tank onto the molten glass mass (or bath) across the full width thereof. The furnace includes burners positioned adjacent to the opposite narrow side for supplying energy, and heat exchangers for energy exchange between the combustion exhaust gases and the combustion air supplied to the burners. The exhaust gas openings are disposed adjacent to the mixture feeding area. The invention is also in a method of operating such a glass melting furnace.

Even when operated with recuperators or regenerators, glass melting furnaces generally suffer from the drawback of a relatively low efficiency. This is due not only to the lack of insulation of the glass tanks, but also due to the fact that the thermal energy of the exhaust gas heat is considerably higher than that required to preheat the combustion air. Here, limits exist with respect to increasing the temperature of the combustion air, because in such a case the heat exchange becomes very complex and the concentration of the poisonous $NO_x$ greatly increases.

Various attempts have been made to utilize expediently the excess heat in the exhaust gas, such as by preheating the mixture, or bath, prior to its feeding into the glass melting tank. However, these attempts proved unsuccessful for a number of reasons. It was found that such preheating may result in premelting of certain constituents of the mixture and such constituents tended to stick to the heat exchanging surfaces. It was also found that unmixing occurs under a direct contact of the exhaust gas with the mixture, or certain constituents of the mixture were carried over or entrained such that the dust concentration increased significantly in the exhaust gas. This resulted in expensive dust removal requirements.

SUMMARY OF THE INVENTION

It is an object of the present invention to provide a glass melting furnace which is free from the above-discussed drawbacks. The furnace of the invention in operation enjoys a significantly enhanced efficiency compared to conventional furnaces, but nevertheless lends itself to an economical construction. Further, the invention results in lower $NO_x$ and lower dust concentrations in the exhaust gas, without requiring in the furnace or for the heat exchange any components parts which are difficult to control or which experience high temperatures.

· Further, in operation the temperatures in the furnace upper portion and the temperatures in the heat exchangers (recuperators) are even lower than in the customarily used conventional furnaces.

In addition to the above-mentioned advantages, the furnace according to the invention lends itself to be constructed economically and operated safely and reliably, while permitting essentially an optional exchange or interchange of fossil and electric energy sources.

In a furnace according to the invention, the roof of the furnace includes between the burner section and the mixture feeding section at least one radiation protective barrier which extends to a position spaced a small distance from the molten glass surface. Electrodes for supplying electric energy in the region of the mixture feeding position are provided within the mixture feeding section.

In order to ensure sufficient preheating of the mixture, the mixture feeding section advantageously has a length at least twice the length of the burner section. At least one further radiation protective barrier is optionally provided in the mixture feeding section to avoid an efficiency-reducing heat transfer by radiation from the burner section.

In order to avoid freezing of the molten glass mass, or bath, below the entering mixture, the electrodes provided in the mixture feeding section may be positioned within the tank bottom.

Further beneficial embodiments, particularly for increasing the efficiency and reducing the expenditure, include that the mixture feeding section has a length greater than that of the burner section, preferably at least twice the length of the burner section. Additionally, at least one further radiation protective barrier is provided in the mixture feeding section. Advantageously the electrodes are positioned within the tank bottom. Preferably, the walls in the mixture feeding section for returning the combustion gases are formed as double walls. The exchangers are formed as recuperators and divided into a high-temperature and a low-temperature section. Further, the glass melting furnace includes means for closing, or isolating, the mixture feeding port. The tank bottom includes a sill below the first radiation protective barrier.

Advantageously, the method of operating the glass melting furnace according to the invention includes cooling the exhaust gases, while preheating the mixture, or batch, floating on the molten glass mass, to a temperature of from 800° to 1000° C. before they are exhausted from the tank space.

Without any substantial technical expenditure, the recuperators may be adapted to heat the air in a countercurrent flow to a temperature of from 600° to 800° C. The mixture or batch may cover, or float on, the glass melt surface at least in the mixture feeding section to obtain the aspired good efficiency.

Thus, the glass melting furnace according to the invention, in conjunction with the method of operation, is adapted to solve, for the first time, the existing problems in a particularly beneficial manner. The principle of the invention resides in feeding the mixture onto the molten glass and preheating it thereon by means of the exhaust gas, thereby cooling the exhaust gas to such a degree that the residual energy may be used to a high degree for preheating the combustion air. Here, maintaining of the liquid (molten) state of the glass and controlling an optimum flow pattern in the mixture preheating region of the tank are ensured while supplying relatively low amounts of electric energy.

The various features of novelty which characterize the invention are pointed out with particularity in the claims annexed to and forming a part of this specification. for a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE INVENTION

DESCRIPTION OF A PREFERRED EMBODIMENT

Figure 1:
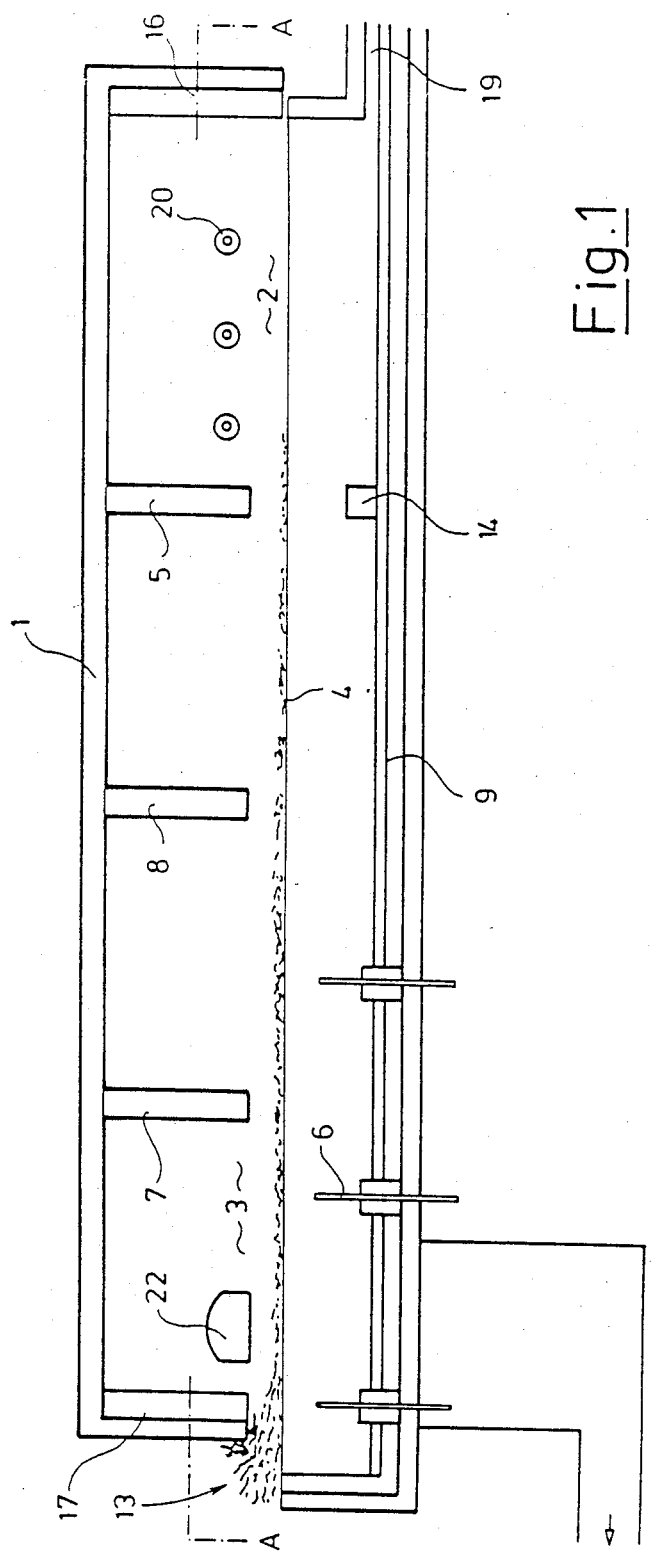
FIG. 1 is a side elevation view of a furnace according to the invention.

Generally referring to the drawings, a glass melting furnace according to the invention comprises an elongate, rectangular tank having a burner section 2 and a mixture, or batch, feeding section 3 which join each other, with the mixture feeding section 3 having a length equal to from 2 to 2½ times the length of the burner section. The term burner section 2 refers to the tank portion in which the burners 20 are positioned which operate by burning oil or gas.

Figure 2:
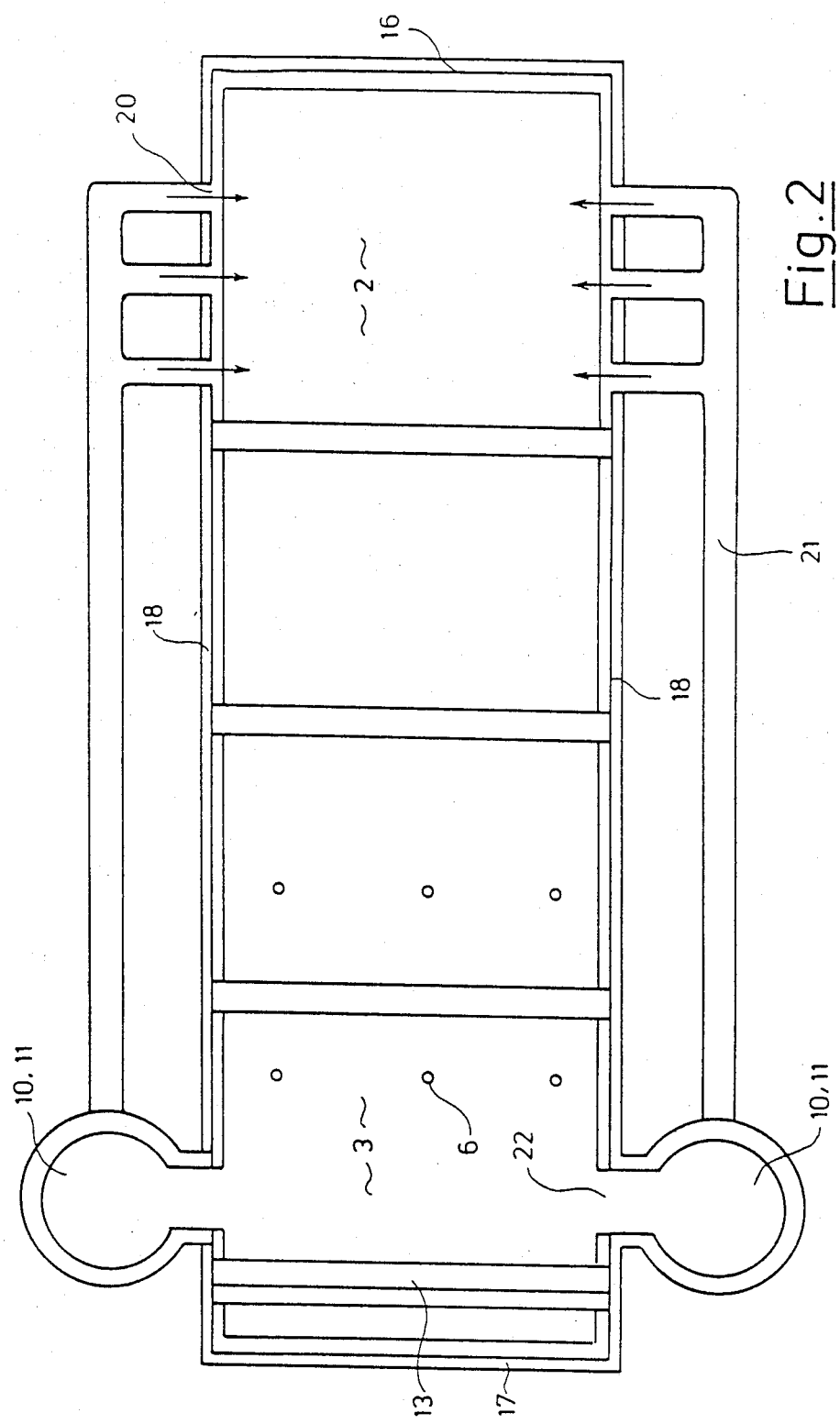
FIG. 2 is a view along view line A—A of FIG. 1.

Further, the tank includes a transverse wall 16 at the side of the burners, a transverse wall 17 at the side of the mixture feeding section, and longitudinal walls 18 (FIG. 2). The furnace upper portion is formed by a roof 1. The tank bottom is denoted by 9.

In the mixture feeding section 3, bottom electrodes 6 are provided which act to prevent freezing of the molten glass mass in this section, especially in the very region where the mixture layer is floating. Furthermore, freezing is prevented from occuring by inducing in the mixture feeding section a flow or stream which constantly transfers glass heated to high temperature from the burner-side region to the region where the mixture is supplied or fed.

The mixture is fed in a conventional manner across the full width of the transverse wall 17; however, means 13 are provided which close or isolate the feeding space from the interior of the tank. Such isolation may be effected by the mixture per se (FIG. 1); alternatively, lock gates, sluices or similar conventional means may be employed.

The tank is constructed as has been described in prior applications of the inventor such that a more detailed description can be omitted. This applied particularly to the configuration of the walls, of the arch roof, the bottom, the burners, the electrodes and the outlet 19 at the end of the burner section 2 remote from the mixture feeding section, as well as the configuration of the exhaust gas outlet openings 22 directly adjacent to the mixture feeding position.

In the interior of the tank, a radiation protective barrier 5 is positioned at the feed-side end of the burner section 2. Barrier 5 extends or depends from the roof 1 to a position closely above the molten glass surface 4 and prevents radiation from entering the mixture feeding section 3. At high chamber temperatures most of the energy is transmitted or transferred by radiation. Accordingly, it is essential to the invention to concentrate within the burner section 2 the energy supplied by the burners 20.

Since considerable amounts of radiation are emitted from the surface of the molten glass, especially from the protective barrier 5 toward the feed side, the mixture feeding section 3 includes another radiation protective barrier or wall 7 in the vicinity of the mixture feeding position, and still another protective barrier 8 intermediate the protective barriers 5 and 7. This structure safely prevents that radiation energy has a noticeable effect on the heating of the mixture, because such heating is to be performed substantially exclusively by the exhaust gas which flows from the burner section 2 through the mixture feeding section 3 and to the exhaust gas outlet openings 22.

The bottom 9 can include a sill 14 at the feed-side end of the burner section 2. Sill 14 acts to set a flow pattern in which hot glass flows back to the floating mixture layer and in this position prevents freezing of the glass in conjunction with the bottom electrodes 6.

After its outflow from the tank, the gas cooled to from 800° to 1000° is supplied first to a high-temperature countercurrent flow recuperator and then to a low-temperature countercurrent flow recuperator from which the gas flows out at a temperature of from about 300° to 350° C. At this temperature, the exhaust gas thermal energy has been largely transferred to the combustion air. However, the gas temperature is above its dew point to avoid corrosion and depositing or settling problems.

The combustion air is preheated from normal (ambient) temperature to a temperature of about 600° to 800° C. by the cooled down exhaust gas in the high temperature recuperator 10. The preheated combustion air is supplied to the burners 20 through pipelines 21. The combustion occurs under relatively low air temperatures, at relatively low flame temperatures and therefore higher concentrations of $NO_x$ are avoided. Accordingly, the exhaust gas is not only cooled down considerably, but also contains extremely low concentrations of $NO_x$ such that the glass melting furnace according to the invention may be operated even in areas of low permissible emission values, e.g., in cities. Because of the low exhaust gas temperatures dust collection equipment can be used without problems.

Figure 3:
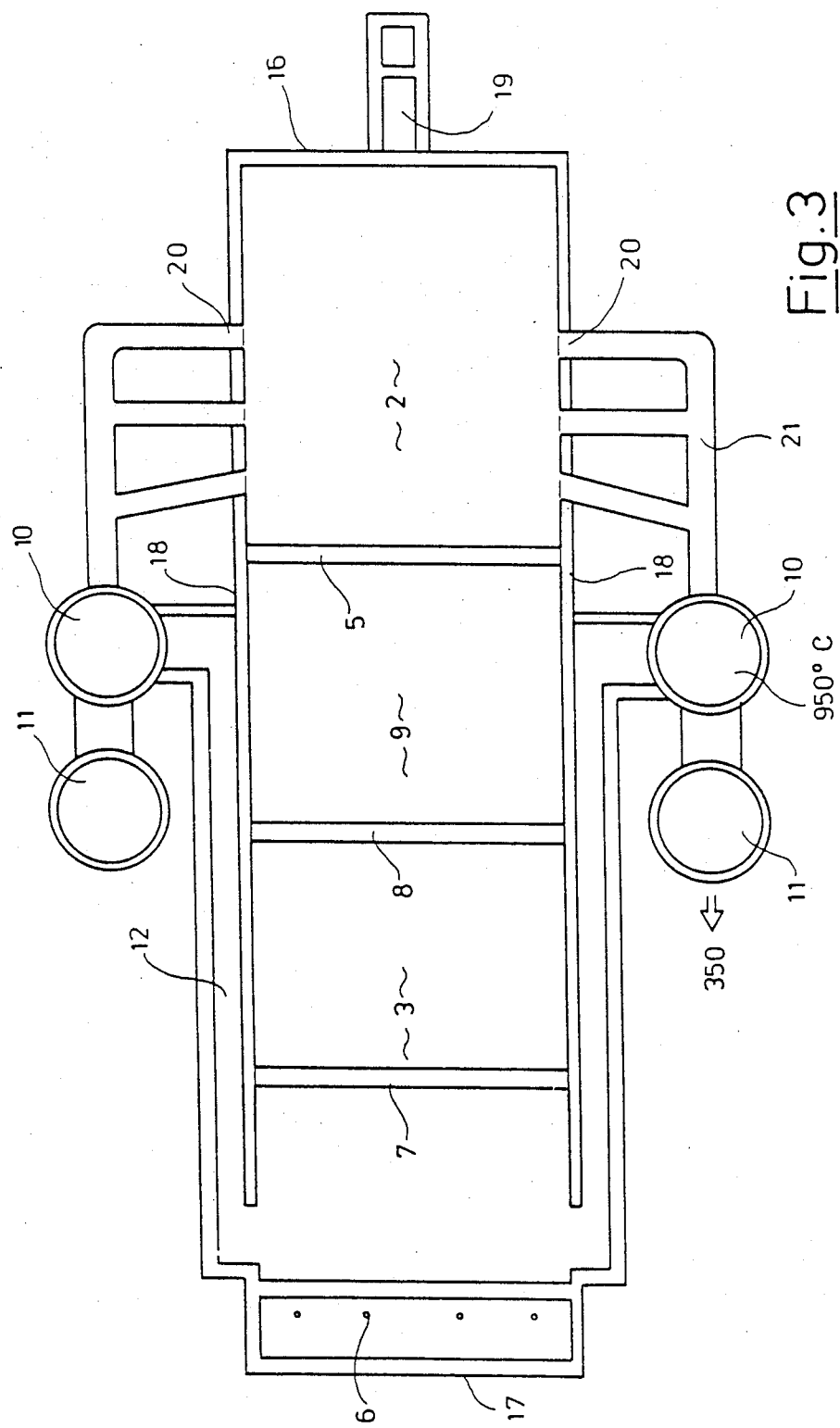
FIG. 3 is a view like FIG. 2 of another embodiment of the invention.

Heat transfer from the exhaust gas to the mixture feeding section 3 may be improved in that the longitudinal walls are formed as double walls 12 (FIG. 3) through which the exhaust gas flows from the outlet openings 22 to the high-temperature recuperator 10. As shown in FIG. 2, the recuperators 10 and 11 also may be combined in a unit and positioned directly adjacent to the outlet openings 22.

In the operation of the tank, it is important that the mixture feeding section 3 performs in its feed-side end the preheating of the mixture exclusively, while substantial melting of the mixture takes place only at the far or burner-side end of the mixture feeding section 3. The glass then is refined within the burner section 2 before the glass is withdrawn or discharged in a conventional manner through a bottom outlet 19 at the end remote from the feed side of the burner section 2. Furthermore, by means of the radiation protective barriers 5, 7 and 8 a gas (flow) velocity of about 10 to 15 m/sec is induced above the mixture, which also provides for a certain convective heat transfer or transmission in addition to the radiation heat transfer. Here, the radiation protective barriers are constructed, for example, in accordance with arches like large doghouse arches.

Further, the ratio of electric energy supplied to the energy supplied by the burners to the furnace may be controlled so that the amount of $NO_x$ does not exceed permissible values. With a higher portion of electric energy, the $NO_x$ concentration is reduced, while it is increased, if the amount of energy supplied by the burners is increased.

Recuperator 10 serves as a radiation recuperator, while recuperator 11, the second one, utilizes convection as the heat transfer mode. Recuperator 11 may be provided therein a cleaning system (dust remover), system Schack, or of a type similar to a spherical recuperator. In this way, it is also ensured that the exhaust gas contains only an extremely low dust concentration such that subsequent dust removal may be unnecessary under various circumstances.

The glass melting furnace according to the invention can be constructed economically since inexpensive refractory materials may be used in the mixture feeding section because of the lower temperatures.

According to the invention, it is contemplated that the entire glass melting furnace and the conduits or pipelines for the exhaust gas as well as for the heated combustion air are properly insulated. Nevertheless, it is surprising to the expert that the specific energy consumption may be reduced to the heretofore unequalled value of from 3100 to 3400 kilojoules per kg of glass.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:

1. A glass melting furnace comprising: a rectangular glass melting tank with a narrow side; feed means for feeding a mixture at the narrow side of said tank across the full width thereof; a section of burners positioned adjacent to an opposite narrow side for supplying energy; heat exchangers for energy exchange between combustion gases and combustion air supplied to the burners; openings for exhausting the exhaust gas disposed adjacent to the mixture feeding position, said furnace having a roof extending between the burner section and the mixture feeding section; at least one radiation protective barrier which depends from said roof and extends to a position spaced a small distance from the molten glass surface; and electrodes within the mixture feeding section for supplying electric energy in the region of the mixture feeding section.

2. The glass melting furnace of claim 1, wherein the mixture feeding section has a length greater than that of the burner section.

3. The glass melting furnace of claim 2, wherein the mixture feeding section has a length at least twice the length of the burner section.

4. The glass melting furnace of claim 1, wherein at least one further radiation protective barrier is provided in the mixture feeding section.

5. The glass melting furnace of claim 1, wherein the tank has a bottom and the electrodes are positioned within the tank bottom.

6. The glass melting furnace of claim 1 having walls in the mixture feeding section for returning the combustion gases, said walls being formed as double walls.

7. The glass melting furnace of claim 1, wherein the exchangers are formed as recuperators and divided in a high-temperature and a low-temperature section.

8. The glass melting furnace of claim 1, further comprising means for isolating the mixture feeding port.

9. The glass melting furnace of claim 1, wherein the tank bottom includes a sill below the first radiation protective barrier.

10. A method of operating a glass melting furnace which has a rectangular glass melting tank with a narrow side with feed means for feeding a mixture at the narrow side of the tank across the full width thereof and a section of burners positioned adjacent to an opposite narrow side for supplying energy, the furnace also having heat exchangers for energy exchange between combustion gases and combustion air supplied to the burners and openings for exhausting the exhaust gas disposed adjacent to the mixture feeding position, the furnace further having a roof extending between the burner section and the mixture feeding section and at least one radiation protective barrier which depends from the roof and extends to a position spaced a small distance from the molten glass surface, there being electrodes within the mixture feeding section for supplying electric energy in the region of the mixture feeding section, the method comprising: cooling the exhaust gases, while preheating the mixture floating on the molten glass mass, to a temperature of from 800° to 1000° C. before the gases are exhausted from the tank.

11. The method of claim 10 wherein the heat exchangers are recuperators and heat the air to a temperature of form 600° to 800° C. in a countercurrent flow.

12. The method of claim 10, wherein the mixture floats on the molten glass surface at least within the mixture feeding section.

* * * * *